Patented June 9, 1942

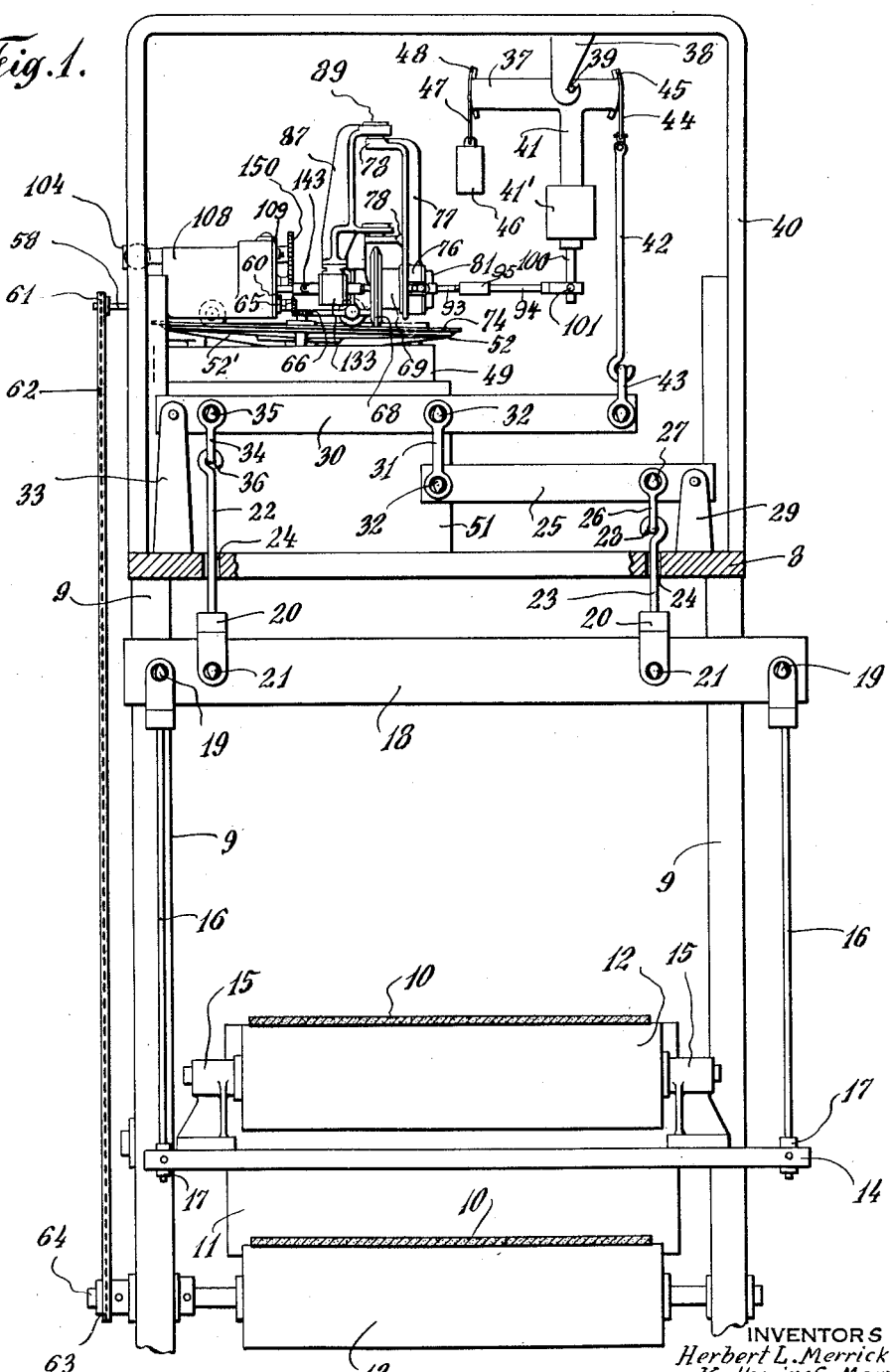

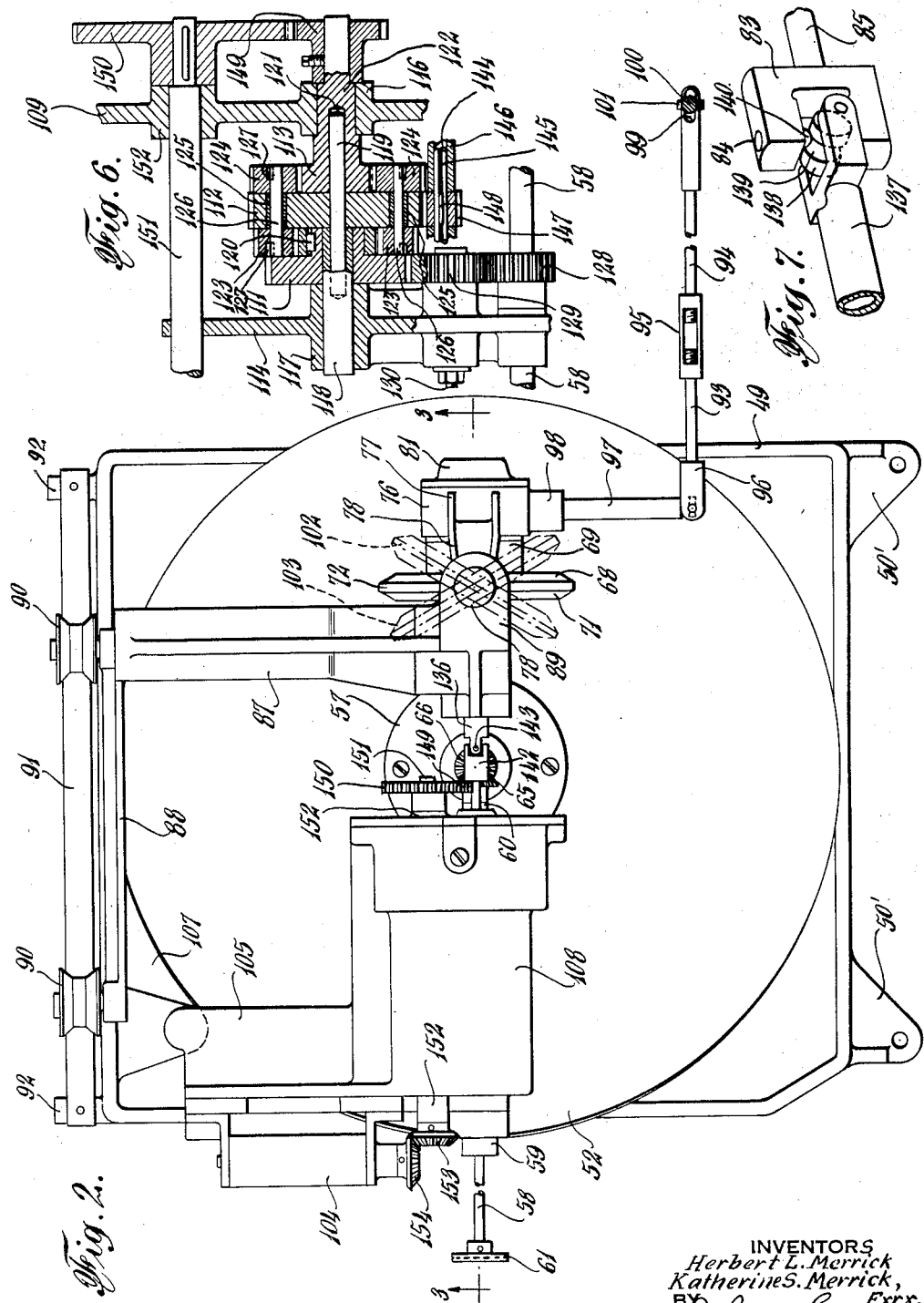

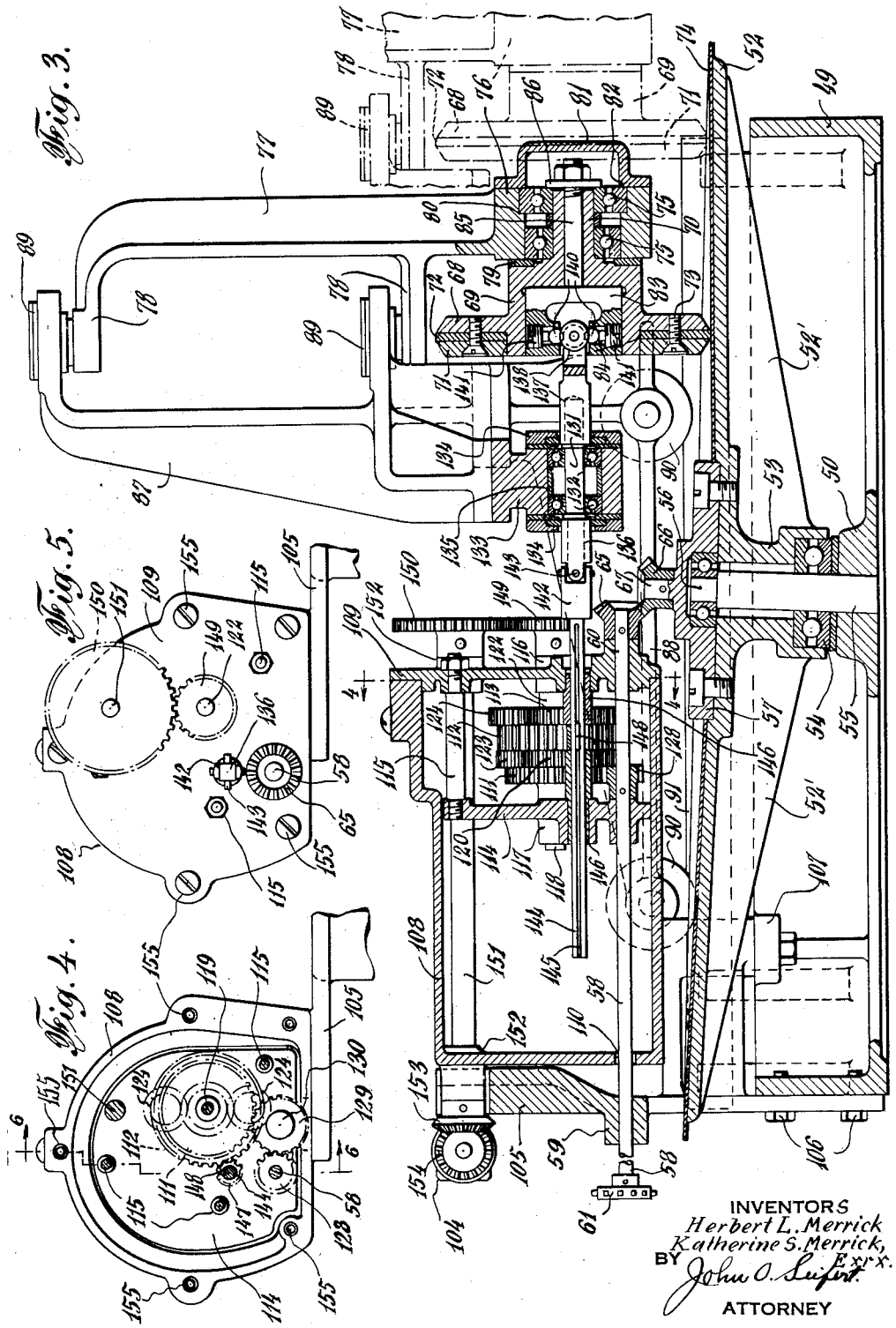

2,285,675

UNITED STATES PATENT OFFICE 2,285,675

INTEGRATING MEANS

Herbert L. Merrick, deceased, late of Passaic, N. J., by Katherine S. Merrick, executrix, Passaic, N. J., assignor to Merrick Scales Mfg. Company, Passaic, N. J., a corporation of New Jersey Application January 16, 1939, Serial No. 251,196

10 Claims. (Cl. 74—194)

This invention relates to integrating means particularly adapted for use in connection with weighing mechanism including a scale beam arranged with means to support a traveling conveyer and means to balance the load transported by the conveyer operative to normally maintain the scale beam in a position of equilibrium and to counterbalance an applied load, and a register to totalize and indicate the weight of material transported by the conveyer, and it is the object of the invention to provide improved means to control the actuation of the register by the speed of the conveyer and the weight of the load transported by the conveyer.

The embodiment of the integrating means comprises a rotatable disk driven by the travel of the conveyer and adapted to rotate a wheel rotatably, pivotally and slidably mounted in frictional contact with the disk, and said wheel being adapted to be adjusted about its pivotal mounting to different angular positions relative to the direction of rotation of the disk by fluctuations of the scale beam from its position of equilibrium. The angular positions of the wheel will cause the wheel to travel radially of the disk under the influence of the rotation of the disk until the wheel assumes its normal position in alinement with the direction of travel of the disk, whereby the speed of rotation of the wheel will increase or decrease depending upon the position of the wheel relative to the center of the disk. The speed of the wheel will increase proportionally to the increase in the distance between the wheel and center of the disk. The rotations of the disk and wheel are transmitted to means to combine said rotations and transmit to the register the integrated value or load transported by the portion of the conveyer supported by the scale beam.

It is another object of the invention to provide improved means for combining the rotations of the disk and wheel to give the integrated value, whereby the wheel is operatively connected to said means by a minimum number of parts.

It is a further object of the invention to provide a novel driving connection between the wheel and improved combining means whereby the wheel is adjusted about its pivotal mounting and along its sliding mounting without affecting the actuation of the combining means and register.

It is a still further object of the invention to arrange the pivotal mounting of the wheel and the connection of the wheel with the combining means relative to the rotation of the wheel whereby the performance of the wheel is not affected.

Further objects and advantages of the invention will be disclosed in the detailed description of the invention.

In the drawings accompanying and forming a part of this invention,

Figure 1 is an elevational view of weighing mechanism showing the integrating means forming the embodiment of this invention mounted in operative relation to the weighing mechanism.

Figure 2 is a plan view, on an enlarged scale, of the integrating means shown in Figure 1.

Figure 3 is a cross sectional view, on an enlarged scale, of the integrating means taken on the line 3—3 of Figure 2 looking in the direction of the arrows, showing in dot and dash lines the position of the wheel where the rotation of the wheel is greater than in the full line position.

Figure 4 is a view of the means for combining the rotations of the disk and wheel taken on the line 4—4 of Figure 3 looking in the direction of the arrows and into the interior of a casing for said combining means from one end thereof.

Figure 5 is a view similar to Figure 4 looking at the exterior of the end of the casing for the combining means to show meshing gears for connecting said means to the register.

Figure 6 is a fragmentary view, on an enlarged scale, of the combining means, partly in section taken substantially on the line 6—6 of Figure 4 looking in the direction of the arrows.

Figure 7 is a perspective view of a portion of the novel connection between the combining means and wheel.

In carrying out the embodiment of the invention illustrated in the accompanying drawings, the weighing mechanism is mounted upon a support or table 8 supported by a series of standards 9 forming a part of the supporting structure of an endless conveyer belt 10 passing around a pair of drums, one of said drums, not shown, being driven and the other drum being shown at 11, rotatably supported on the supporting structure in spaced relation to the standards 9 supporting the table 8. The upper and lower stretches of the conveyer belt between the drums are supported by a plurality of idler rollers 12, 13, respectively, rotatably supported in the standards 9 with one of the rollers 12 mounted on a platform 14 by standard bearings 15 fixed to the platform.

The platform 14 is suspended from the weighing mechanism by rods 16 fixed at one end to the platform, as at 17, and the opposite ends being bifurcated and arranged to loosely engage knife edges of pins fixed in and extending laterally from the opposite sides of a cross bar 18, as at 19 in Figure 1. The platform 14 and the portion of the conveyer belt passing thereover constitutes a scale platform. The bar 18 is swingingly suspended from the weighing mechanism by bifurcated members 20 having alined openings in the bifurcations for the loose engagement of knife edges of pins fixed in and extending from the opposite sides of the bar adjacent to the pins 19, as shown at 21 in Figure 1, and the closed ends of said members 20 being arranged with rods 22, 23 adapted to extend through openings 24 in the table 8. The rod 23 is shorter than the rod 22 and is adapted to be pivotally connected to a scale lever 25 by a stirrup member 26 having alined openings in the leg portions to loosely engage knife edges of pins fixed in and extended from opposite sides of said lever 25, as at 27, and the U portion of said member being loosely engaged by a hook portion at the free end of the rod 23, as shown at 28. The scale lever 25 is pivotally mounted at one end adjacent the pins 27 on a bracket 29 fixed to the upper face of the table 8, and the opposite end of the lever is pivotally connected to an intermediate portion of another scale lever 30 by a pair of links 31 having openings at the opposite ends to loosely engage knife edges of pins fixed in and extending laterally from the opposite sides of the levers 25 and 30, as shown at 32. The lever 30 is pivotally mounted to extend above and in alinement with the lever 25 at an end remote from the lever 27 by a bracket 33 fixed to the upper surface of the table 8, and said lever 30 is pivotally connected to the rod 22 adjacent the bracket 33 by a stirrup member 34 having alined openings in the leg portions to loosely engage knife edges of pins fixed in and extending from the opposite sides of the lever 30, as at 35, and the U shaped portion of said stirrup member loosely engaging a hook portion at the free end of the rod 22, as shown at 36.

By this arrangement, the weight on the platform 14 is evenly supported by the scale levers 25, 30, and is transmitted by said levers to a scale or weighing beam 37 pivotally mounted intermediate its ends by knife edge pivots extending laterally from the opposite sides of the beam to loosely engage arcuate shaped recesses in hanger brackets 38, as shown at 39. The brackets 38 are fixed to the inner surface of the top of a housing 40 mounted on the table 8 to enclose the entire weighing mechanism. The scale beam 37 is of T shape with the vertical leg portion adjacent one end and in line with the pivots 39, as shown at 41 in Figure 1, and the end of the beam adjacent the leg portion 41 is connected to the free end of the lever 30 by a rod 42 having one end loosely engaging a stirrup member 43 similar to the stirrup members 26, 34 and pivotally connected to the free end of the lever 30 in the same manner as said stirrup members are connected to their respective levers. The opposite end of the rod 42 is connected to the short end of the beam 37 by a flexible band 44 extended over and connected to an arcuate face arranged on the short end of the scale beam, as at 45. The opposite or long end of the scale beam is arranged with a compensating or counter-weight 46 connected to the beam 37 by a flexible band 47 extended over and fixed to an arcuate face of the long end of the scale beam, as at 48 in Figure 1. A pendulum weight 41' is adjustably mounted on the leg portion 41 of the scale beam 37 for accuracy in weighing.

The speed of travel of the conveyer belt 10 and the fluctuations of the scale beam are combined and integrated to give the weight of material carried by the conveyer belt. The means to combine and integrate these values are supported by a rectangular frame member 49 arranged with a central boss 50 and ears 50' for mounting said frame member in elevated position from the table 8 on a raised platform 51 fixed to said table. Said combining means comprise a disk 52 having a conical friction face declining inwardly from the periphery toward the axis of the disk and having a hub 53 extending from the opposite face and rotatably, the disk being antifrictionally supported by an annular race of ball bearings engaged in an enlarged annular recess in the lower or free end of the hub and supported by the boss 50 of the frame 49, as shown at 54 in Figure 3. The upper end of the hub 53 is supported by a stud shaft 55 fixed in the boss 50 to extend through the ball race 54 and into the hub 53 with the upper end reduced for the mounting of a ball bearing race, as at 56, and said race supporting the upper or inner end of the hub 53 by being enclosed with a cap member 57 having a lateral flange engaged and fixed in an annular recess in the conical face of the disk 52 concentrically of the hub 53, as shown in Figure 3. The recess in the cap member 57 is substantially of the same diameter as the ball bearing race 56 and is greater than the bore of the hub 53, so that the disk 52 will be antifrictionally supported without any lateral movement, the ball race 54 closely encircling the lower end of the shaft 55. The bore of the boss 50 extends at an angle to the vertical axis of the frame 49, whereby the stud shaft 55 will extend obliquely from the boss and a portion of the conical face of the disk 52 will be positioned in a horizontal plane during the travel of the disk. The disk is rotated in synchronism with the travel of the conveyer belt 10 by means for transmitting the movement of the conveyer belt to the disk, comprising a shaft 58 rotatably mounted at the opposite ends in bearing bosses 59, 60 arranged above the disk 52 in a manner to be hereinafter described to mount the shaft in a horizontal plane with one end extending beyond the wall of the frame 49 and through the housing 40 and the opposite end terminating adjacent to the shaft 55. The end of the shaft 58 projecting from the housing 40 is arranged with a sprocket wheel 61 fixed thereto and engaged by an endless sprocket chain 62 engaging around a sprocket wheel 63 fixed on an end of a shaft 64 of one of the idler rollers 13 extending from the outer side of a standard 9, as shown in Figure 1. The end of the shaft 58 adjacent to the shaft 55 is arranged with a beveled pinion 65 fixed thereto in mesh with a beveled pinion 66 fixed to a stud 67 integral with and extended centrally from the cap member 57, as shown in Figure 3, whereby rotation of the pinions 65, 66 will impart rotation to the disk 52. The rotation of the disk 52 representing the travel of the conveyer belt 10 is one of the values to be integrated. To prevent warping of the conical face of the disk 52, the opposite face is reinforced by ribs 52' extending radially from the hub 53.

The other value to be integrated, which is the fluctuations of the scale beam 37, is transmitted to a wheel rotatably, pivotally and slidably mounted to extend at right angles to and in frictional contact with the horizontally extending portion of the disk 52, so that the rotation of the wheel is imparted to the wheel. Said wheel comprises an annular portion 68 integral with and extending concentrically around the outer periphery of a hub portion 69 of cup shape in cross section having a hollow pintle 70 projecting centrally from the closed end thereof and the opposite open end of the hub portion extending from the annular portion 68. The periphery of the annular portion 68 is beveled and cooperates with the beveled periphery of an annular member 71 of the same diameter as the annular portion 68 and having a central opening of a diameter to mount said member on the end of the hub portion 69 projecting from the annular portion 68, and a relatively thin annular member 72 of friction material having a diameter substantially the same as the greater diameters of the portion 68 and member 71, so that when the members 71, 72 are mounted on the hub portion 69 and secured to the annular portion 68 by screws 73, with the member 72 between the member 71 and portion 68, as shown in Figure 3, a wheel having a peripheral bead arranged with beveled edges is provided to assure the positive transmission of the rotation of the disk 52 to said wheel. To further facilitate the transmission of rotation to the wheel 68—72, the conical face of the disk is arranged with a friction surface 74 to be engaged by the friction bead 72. The friction wheel 68—72 is rotatably mounted in frictional contact with the disk surface 74 by engaging the pintle 70 in a pair of ball bearing races 75 mounted in spaced relation to each other in the opposite end portions of an opening in a boss 76 arranged at an end portion of a frame member 77 having laterally extending arm portions arranged with vertically extending pintles, as shown at 78. The outer face of the closed end of the hub portion 69 in opposed relation to the inner side of the boss 76 is arranged with a ring 79 of antifriction material to further reduce friction to the rotation of the wheel. The ball bearing race 75 mounted in the outer end of the boss opening is held against movement longitudinally of the boss by increasing the diameter of said end portion and ball race mounted therein to form a shoulder in the boss opening, as shown at 80 in Figure 3, and a cap member 81 having a laterally extending flange secured to the boss and engaging a portion of the race, as shown at 82. The recess in the hub portion 69 is comparatively large and is adapted for the mounting of a bifurcated or yoke member 83 having alined openings in the bifurcations or legs, as at 84 for a purpose to be hereinafter described, and a stem 85 extending longitudinally from the outer face of the connecting portion of said member adapted to be engaged in the bore of the pintle 70 with the free end projecting from the pintle and boss 76 into the cap member 81 and screw threaded for the engagement thereon of a nut with a washer interposed between the nut and pintle and engaging the secured ball bearing race 75, as shown at 86 in Figure 3, whereby the hub portion 69 is held against longitudinal movement in the boss 76.

The wheel carrying frame 77 is pivotally mounted to have movement about an axis perpendicular to the axis of rotation of the friction wheel 68—72 in a carriage of right angular shape in plan view, as shown in Figure 2, comprising a portion 87 extending in an upward direction obliquely from the other portion 88 of said member, and said portion 87 having at the free end a pair of laterally extending arms arranged with circular bearings for the pivotal mounting of the pintles 78 of the frame member 77, as shown at 89. Grooved rollers 90 mounted on the opposite ends of the portion 88 of the carriage engage and support the carriage on a rail 91 fixed to lugs 92 extending laterally from a side wall of the frame 49, whereby the carriage and wheel carrying frame 77 is adapted to have movement radially of the disk 52 and parallelly of the rail 91. The pivotal mounting 78, 89 of the frame member 77 is in vertical alinement with the center of the wheel 68—72 and the point of contact between the wheel bead 72 and the disk surface 74 to facilitate the adjustment of the wheel about its pivotal mounting 78, 89 by the fluctuations in the scale beam 37. The fluctuations of the scale beam are transmitted to the frame 77 and friction wheel by an adjustable rod composed of two sections 93, 94 adjustably connected to each other by a turnbuckle 95. The rod section 93 is arranged with a bifurcated portion 96 universally connected to a rod 97 fixed in a socket 98 projecting laterally from the frame boss 76. The other rod section 94 is arranged with an elongated opening 99 for the engagement of a reduced portion 100 extending from and forming a part of the vertical leg portion 41 of the scale beam and pivotally connected to the rod section, as at 101. By this connection between the scale beam and frame member 77, the wheel 68—72 is adjusted to different angular positions relative to the direction of travel of the disk 52, as shown in the dot and dash positions of the wheel in Figure 2, to cause the wheel to move radially of the disk under the influence of the rotation of the disk. In the present embodiment of the invention with the disk rotating in a clockwise direction, the positioning of the wheel to extend outwardly toward the periphery of the disk by an increase in the weight of the material on the conveyer 10, as shown in the dot and dash line position 102 of the wheel in Figure 2, will cause the wheel to travel radially toward the periphery of the disk. The movement of the wheel radially of the disk will stop when the wheel and rod 97 extend at a right angle to the rod 93, 94, as shown in Figure 2, and the wheel positioned adjacent the periphery of the disk, as shown in dot and dash lines in Figure 3, will rotate at a greater rate of speed than it will rotate when positioned nearer the center of the disk, as shown in full lines in Figure 3. When the weight on the conveyer decreases, the vertical leg portion 41 of the scale beam will swing away from the disk 52 and the wheel will be adjusted about its pivotal mounting to rotate in a plane as shown in the dot and dash position 103 of the wheel in Figure 2. In this position 103 of the wheel, the wheel will travel radially of the disk toward the center thereof under the influence of the rotation of the disk and when said movement of the wheel stops, the velocity of rotation of the wheel will be decreased.

The combined rotations of the disk 52 and wheel 68—72 are recorded and indicated by a register of usual construction and shown in a general way at 104 supported by a bracket 105 mounted on the side wall of the frame 49, adjacent the housing 40 as by screws 106 shown in Figure 3 and a lug 107 extended inwardly from an adjacent wall of the frame 49, as shown in Figure 2, with the register exposed to view through an opening in the housing 40, as shown in Figure 1. The rotations of the disk and wheel are combined and the register is actuated by differential means mounted in a casing 108 supported by the bracket 105 to extend above the disk 52 from the bracket 105 to adjacent the center of the disk. The boss 59 is arranged in the bracket 105 and the boss 60 is in an end wall plate 109 of the casing 108, whereby the shaft 58 is supported by said bosses to extend longitudinally through the casing 108, the wall of the casing opposite the end wall 109 being arranged with an opening 110 for the passage of the shaft, as shown in Figure 3. The differential means comprises a series of three members in the form of gears 111, 112, 113, gear 111 being operatively connected to the conveyer 10 and disk 52, the gear 112 being operatively connected to and driven by the friction wheel 68—72, and the gear 113 being operatively connected to the prime mover of the register 104. The gears 111, 112, 113 are rotatably mounted on a common axis but adapted to rotate independently of each other by providing a partition wall 114 supported by and spaced from the end wall 109 by rods having reduced ends screw threaded for engagement with screw threaded openings in the wall 114 and nuts exteriorly of the end wall 109, as shown at 115 in Figures 3, 4 and 5. The walls 109 and 114 are arranged with horizontally alined bosses 116, 117, respectively, and the boss 117 supporting a spindle 118 having a bore at the inner end for the engagement of one end of a spindle 119 with both spindles extending into the chamber formed by the walls 109, 114. The gear 111 is arranged with an elongated hub having gear teeth arranged thereon, as at 120, and loosely mounted on the spindle 118 with the gear 111 adjacent the boss 117. The end of the spindle 119 opposite the end supported by the spindle 118 is engaged in a bore 121 extending centrally into an elongated hub portion of the gear 113 having an intermediate portion of reduced diameter and rotatably mounted in the boss 116, as shown at 122 in Figure 6. The gear 112 is mounted on the spindle 119 between the gears 111 and 113 and is adapted to carry a plurality of planetary gears 123, 124 on both faces thereof by being arranged with transverse openings adjacent the periphery and having antifriction bushings mounted therein, as shown at 125 in Figure 6, for rotatably supporting shafts 126 having the opposite ends extending from the faces of the gear and upon which end portions the gears 123, 124 are engaged and fixed thereto by keys 127. The bushings 125 are arranged in the gear 112 and the gears 123, 124 are of a diameter, so that the gears 123 will mesh with gear teeth 120 on the hub of gear 111 and the gears 124 will mesh with the gear 113, whereby the rotations of the gears 111 and 112 are combined and transmitted to the gear 113.

The gear 111 is actuated in synchronism with the travel of the conveyer belt 10 and rotation of the disk 52 by a pinion 128 fixedly mounted on the shaft 58 in mesh with a pinion 129 rotatably mounted on a stud shaft 130 fixed in the partition wall 114 with said pinion 129 meshing with the gear 111, as shown in Figures 4 and 6. The gear 112 is rotated in synchronism with the friction wheel 68—72 by a shaft 131 rotatably supported by ball bearing races 132 in a boss 133 suspended from the frame portion 87 of the carriage in the vertical plane of the bearings 89 and having the bore extending in axial alinement with the axis of the wheel 68—72 when said wheel is positioned with the axis extending in a direction radially of the disk 52, as shown in Figure 3. The ball bearing races 132 are retained in the carriage boss 133 by collars 134 releasably mounted on the opposite ends of the boss and in spaced relation to each other by a tubular spacer 135, as shown in Figure 3. The shaft 131 is retained in the boss 133 against longitudinal movement by sleeve or hub portions of coupling members 136, 137 mounted on the opposite ends of the shaft with the inner ends of the hub portions extending through the collars 134 into abutting relation with the races of the ball bearings. The free or outer end of the coupling member 137 is bifurcated for the rotatable mounting of an elongated roller 138 having an annular groove 139 of arcuate form in cross section intermediate the ends and positioned by the coupling member 137 to extend into the bifurcated member 83 with the groove 139 in alinement with the openings 84 therein to be engaged by balls 140 mounted in said openings 84 and maintained in engagement with the groove by projections of plugs screw threaded in enlarged outer ends of the openings 84, as shown at 141 in Figure 3. This universal joint connection 138, 140 between the shaft 131 and wheel 68—72 will permit of adjustment of said wheel with its carrying frame 77 about the pivotal mountings 78, 89 in the carriage without interfering with the rotation of the wheel and transmission of said rotation to said shaft. The outer or free end of the coupling member 136 is bifurcated for universal connection with the bifurcated end of another coupling member 142, as shown at 143, said coupling member 142 being fixed to a shaft 144 having an elongated slot 145 therein. The shaft 144 is rotatably supported in bushings 146 fixed in and extending toward each other from bosses arranged in the walls 109, 114 with the inner or free ends of said bushings spaced from each other for the mounting of a pinion 147 on the shaft 144 in mesh with the gear 112. The pinion 147 is arranged with a key 148 to engage the slot 145 in shaft 144 to rotate with the shaft 144 and permit sliding movement of said shaft imparted thereto by the movement of the frame member 77 with the carriage 87 on the rail 91. The universal connection or joint 143 will permit rotation of the shaft 144 by the shaft 131 even though the shafts are out of alinement with each other. The connection between the wheel 68—72 and gear 112 while being flexible to permit the wheel carrying frame 77 to move freely about the pivots 78, 89 and the carriage 87 along the rail 91, is of sufficient rigidity to assure the complete transmission of the rotation of the wheel to the gear.

The integrated value of the combined rotations of the gears 111 and 112 is transmitted to the register 104 through the gear 113 by a pinion 149 fixed on a further reduced portion of the elongated hub 122 of the gear 113 extending from the boss 116 exteriorly of the casing 108, said pinion 149 meshing with a gear 150 fixed on an extending end of a shaft 151 rotatably mounted in bosses 152 arranged in the wall 109 and opposite wall of the casing 108 with the opposite end of the shaft extending from said opposite end wall and arranged with a beveled pinion 153 meshing with a beveled pinion 154 mounted on the shaft of the prime mover of the register 104.

The entire combining or differential means are readily mounted in or removed from the casing 108 by removably mounting the end wall 109 on the casing by means of screws engaged in openings around the edges of said wall and screw threaded into lugs arranged on the casing, as at 155 in Figures 4 and 5. The differential means are mounted as a unit between the walls 109 and 114, so that the removal of the wall 109 from the casing will remove the differential means from the casing. It will be necessary to remove the sprocket wheel 61 from the shaft 93 and the beveled pinion 153 from the shaft 151 before removing the wall 109 from the casing 108.

Having thus described the invention, what is claimed:

1. In integrating means, a disk having a friction face declining inwardly from the periphery toward the axis of the disk and supported to rotate about an axis to dispose a radial portion of the friction face in a horizontal plane, a friction wheel, and a carriage supported to have movement in a plane parallel to and having a portion disposed above the horizontal portion of the friction face of the disk and supporting the friction wheel to rotate about its axis and to have adjustment about an axis perpendicular to the axis of rotation of the wheel and positioning the friction wheel with a peripheral portion below its axis of rotation in alinement with the perpendicular axis of adjustment of the wheel in the carriage in frictional engagement with the horizontal portion of the friction face of the disk and adapted to move the carriage and assume different positions radially on the horizontal portion of the friction face of the disk and be rotated at different speeds from the rotation of the disk by adjustment of the friction wheel about its perpendicular axis of adjustment and changing the plane of rotation of the friction wheel relative to the plane of rotation of the friction disk.

2. In integrating means, a rotatable friction disk, a friction wheel, a carriage, a rail disposed at one side of the axis and extending transversely of the friction disk, rollers mounted on the carriage engaging and supporting the carriage on the rail to have movement longitudinally thereon and laterally toward and away from the disk, said carriage having a portion overhanging and extending toward the axis of the disk, a carrier supporting the friction wheel to rotate about its axis and pivotally connected above the axis of the wheel to and have adjustment in the portion of the carriage overhanging the disk about an axis perpendicular to the axis of rotation of the wheel to change the plane of rotation of the wheel, and the wheel maintained by the overhanging portion of the carriage in frictional engagement with the disk, the friction wheel by the rotation of the disk normally assuming a position with its axis disposed radially of the disk, and adjustment of the wheel with the wheel carrier about its perpendicular axis of adjustment in the carriage and change in the plane of rotation of the wheel causing the wheel to move the carriage on the rail and assume different positions radially on the disk.

3. In integrating means, a rotatable friction disk, a friction wheel, a carriage supported at one side of the axis and movable transversely of the disk and having a portion spaced above and extending laterally toward the axis of the disk, a carrier supporting the wheel to rotate about its axis and supporting the laterally extending portion of the carriage and pivotally connected thereto to have adjustment about an axis perpendicular to the axis of the wheel and maintaining the friction wheel in engagement with the disk, the rotation of the disk causing the friction wheel to effect adjustment of the wheel carrier with the wheel to position the wheel with is axis of rotation disposed radially of the disk, and adjustment of the wheel carrier with the wheel about its perpendicular axis of adjustment in the carriage changing the plane of rotation of and causing the friction wheel by the rotation of the disk to move the carriage and assume different positions radially on and be rotated at different speeds from the disk, a shaft journaled in the carriage, a roller having a peripheral groove carried by said shaft to rotate on an axis disposed at a right angle to the axis of the shaft, and globular members carried by the wheel engaging diametrically opposite portions of the roller groove coupling the wheel to the shaft to permit adjustment of the wheel with the wheel carrier about its perpendicular axis of adjustment in the carriage and transmit the rotation of the wheel to the shaft in all positions of adjustment of the wheel.

4. In integrating means, a rotatable friction disk, a carriage supported and guided to have movement in a plane transversely of the disk, a wheel frictionally rotated from the disk pivotally connected above its axis of rotation to the carriage to participate in the movement of the carriage and move radially of the disk and to have adjustment about an axis perpendicular to the axis and in the plane of rotation of the wheel, said wheel by the rotation of the disk normally assuming a position with its axis of rotation extending radially of the disk and the wheel caused to change its plane of rotation and assume different positions radially on and be rotated at different speeds from the disk by adjustment of the wheel about its perpendicular axis of adjustment in the carriage, and a shaft journaled in the carriage connected to the wheel to permit adjustment of the wheel about its perpendicular axis of adjustment in the carriage and transmit the rotation of the wheel to the shaft in all positions of adjustment of the wheel.

5. In integrating means including a rotatable friction disk and a wheel frictionally rotated from the disk, a carriage supported to have movement transversely of the disk, means supporting the wheel to rotate about its axis of rotation pivotally connected above the axis of rotation of the wheel to the carriage to have adjustment on an axis perpendicular to the axis of rotation of the wheel, the rotation of the wheel from the disk effecting adjustment of the wheel supporting means with the wheel to normally position the wheel with its axis of rotation disposed radially of the disk and adjustment of the wheel with the wheel supporting means about its perpendicular axis of adjustment in the carriage changing the plane of rotation of and causing the wheel to move the carriage and travel radially of the disk to be rotated at different speeds from the disk and the carriage guiding the wheel in the radial movement thereof, a shaft journaled in the carriage, and means to connect the wheel to said shaft arranged to permit adjustment of the wheel with the wheel supporting means about its perpendicular axis of adjustment in the carriage and transmit the rotation of the wheel to the shaft in all positions of adjustment of the wheel.

6. In integrating means, a rotatable friction disk, a carriage supported to have movement in a plane transversely of and toward and away from the disk, said carriage having a portion extending laterally toward the axis of the disk and movable radially of the disk by the movement of the carriage transversely of the disk and cause the carriage to move on its support toward the disk, a wheel frictionally rotated from the disk, a carrier rotatably supporting the wheel to rotate about its axis pivotally connected to the portion of the carriage movable radially of the disk to have adjustment about an axis perpendicular to the axis of rotation of the wheel and maintaining the wheel in frictional engagement with the disk, said wheel by the rotation of the disk effecting adjustment of the wheel carrier to position the wheel with its axis of rotation extending radially of the disk and adapted to be adjusted with the carrier about its perpendicular axis of adjustment in the carriage to change the plane of rotation of the wheel and thereby cause the wheel by the rotation of the disk to move the carriage and assume different positions radially on the disk.

7. In integrating means, a rotatable friction disk, a wheel frictionally driven from the disk, a carriage supported to have movement in a plane transversely of the disk, a carrier supporting said wheel to rotate about its axis pivotally connected to the carriage to have adjustment with the wheel about an axis perpendicular to the axis of rotation of the wheel and frictionally contact a peripheral portion of the wheel with the disk in alinement with the perpendicular axis of adjustment of the carrier in the carriage, said wheel being maintained in frictional engagement with the disk by the carriage and operative by the rotation of the disk to effect adjustment of the wheel carrier to position the wheel with its axis of rotation extending radially of the disk and adapted to move and travel with the carriage to assume different positions radially on and be rotated at different speeds from the disk by the adjustment of said carrier with the wheel about its pivotal connection with the carriage to change the plane of rotation of the wheel, a shaft mounted to rotate and have axially slidable movement, a shaft journaled in the carriage having a universal joint connection with the slidable shaft, and means to connect the shaft mounted in the carriage to the friction wheel arranged to permit the wheel to be adjusted with the wheel carrier about its perpendicular axis of adjustment in the carriage and transmit the rotation of the wheel to said shaft in all positions of adjustment of the wheel.

8. In integrating means, a rotatable friction disk, a wheel frictionally driven from the disk, a carriage, means to support the carriage at one side of the axis of the disk to have movement transversely of and toward and away from the disk, said carriage having a part extending laterally toward the axis and disposed above the disk and adapted to be moved radially of the disk by the movement of the carriage on its support transversely of the disk, a carrier supporting the wheel to rotate about its axis supporting and pivotally connected to the portion of the carriage disposed above the disk to have adjustment with the wheel about an axis perpendicular to the axis of the wheel and in the plane of rotation of the wheel and positioning the wheel with a peripheral portion contacting the disk in alinement with the perpendicular axis of adjustment of the carrier, said wheel by the rotation of the disk normally assuming a position with its axis of rotation extending radially of the disk and adapted to be adjusted with the wheel carrier about its pivotal connection with the carriage to change the angular position of the axis of rotation of the wheel and cause the wheel by the rotation of the disk to move the carriage and travel therewith to different positions radially on and be rotated at different speeds from the disk, a shaft journaled in the carriage, and co-operating coupling members mounted on said shaft and the wheel to connect the wheel to the shaft to permit adjustment of the wheel with the wheel carrier about its pivotal connection with the carriage and transmit the rotation of the wheel to the shaft in all positions of adjustment of the wheel.

9. In integrating means, a rotatable friction disk, a carriage movable in a plane transversely of the disk, a friction wheel having a hub extending axially from one side thereof, a carrier in which the wheel hub is rotatably mounted pivotally connected to the carriage to have adjustment with the wheel about an axis perpendicular to the axis of rotation of the wheel, the wheel by the rotation of the disk normally assuming a position on the disk with its axis extending radially thereof and adjustment of the wheel carrier about its pivotal connection with the carriage changing the plane of rotation of and causing the wheel by the rotation of the disk to assume different positions radially on the disk and move the carriage therewith, a shaft journaled in the carriage, a bifurcated member fixed to one end of said shaft, a roller rotatably supported in the bifurcation of said member to rotate on an axis intersecting the axis of rotation of the wheel and perpendicular axis of adjustment of the carrier and having a peripheral groove disposed in the plane of the axis of said wheel, and globular members carried within the wheel hub in line with the perpendicular axis of adjustment of the wheel carrier engaging the roller groove above and below the axis of the roller and couple the wheel to the roller to have adjustment on the roller about an axis intersecting the axis of the roller by the adjustment of the wheel with the wheel carrier about its pivotal connection with the carriage and transmit the rotation of the wheel to said shaft in all positions of adjustment of the wheel.

10. In integrating means, a rotatable friction disk, a carriage movable in a plane transversely of the disk, a friction wheel having a hub extended axially from one side thereof, said hub having two diameters with the wheel disposed peripherally of the portion of the hub of larger diameter and the hub bore having two diameters with the portion of least diameter extended through the hub portion of least diameter, a carrier in which the wheel is rotatably mounted at the hub portion of least diameter and said carrier pivotally connected to the carriage to have adjustment with the wheel about an axis perpendicular to the axis of rotation of the wheel, said wheel by the rotation of the disk adapted to normally assume a position on the disk with the axis of the wheel extending radially of the disk and adjustment of the wheel with the wheel carrier changing the plane of rotation of and causing the wheel to travel radially of the disk and move the carriage therewith, a shaft journaled in the carriage, a bifurcated member fixed to one end of said shaft with the bifurcated portion extended into the portion of larger diameter of the bore in the wheel hub, a roller rotatably carried in the bifurcation of said member to rotate on an axis intersecting the perpendicular axis of adjustment of the wheel carrier and having a peripheral groove disposed in the plane of the axis of rotation of the wheel, a head engaged in the portion of larger diameter of the bore in the wheel hub and having a stem engaged in the portion of smaller diameter of the bore with the head abutting the shoulder formed by the portion of larger diameter of the hub bore and secured therein, and globular members carried by said head engaging diametrically opposite portions of the roller groove in line with the perpendicular axis of adjustment of the wheel carrier connecting the wheel to the roller to have adjustment thereon as the wheel is adjusted with the wheel carrier about its perpendicular axis of adjustment and transmit the rotation of the wheel to the shaft.

KATHERINE S. MERRICK,
*Executrix of the Estate of Herbert L. Merrick, Deceased.*

CERTIFICATE OF CORRECTION.

Patent No. 2,285,675.                                                June 9, 1942.

HERBERT L. MERRICK, DECEASED,
BY KATHERINE S. MERRICK,
EXECUTRIX.

It is hereby certified that the name of the assignee in the above numbered patent was erroneously written and printed as "Merrick Scales Mfg. Company" whereas said name should have been written and printed as --Merrick Scale Mfg. Company--, as shown by the record of assignments in this office; and that the said Letters Patent should be read with this correction therein that the same may conform to the record of the case in the Patent Office.

Signed and sealed this 28th day of July, A. D. 1942.

(Seal)                                                      Henry Van Arsdale,
Acting Commissioner of Patents.